Jan. 30, 1951 W. H. BAILEY 2,539,605
WEED DEFLECTOR FOR FISHING LURES
Filed April 22, 1948
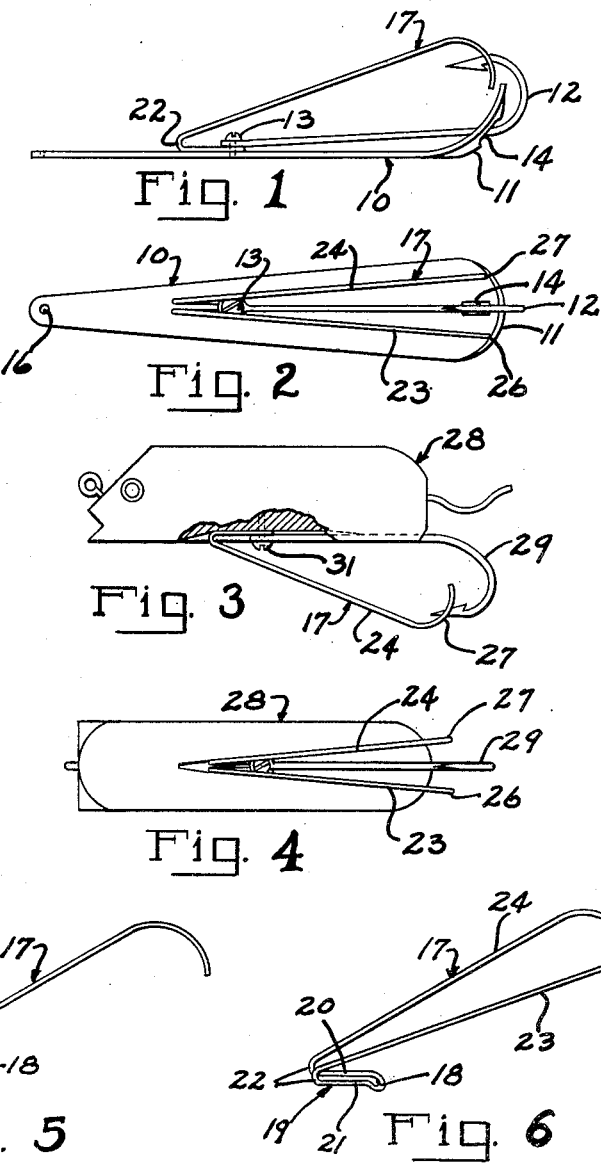
Inventor
WALTER H. BAILEY
By Jennings & Carter
Attorneys Patented Jan. 30, 1951

2,539,605

UNITED STATES PATENT OFFICE 2,539,605

WEED DEFLECTOR FOR FISHING LURES

Walter H. Bailey, Columbus, Ohio, assignor to Fred V. Bailey, Birmingham, Ala.

Application April 22, 1948, Serial No. 22,673

1 Claim. (Cl. 43—42.43)

My present invention relates to fishing lures and has for an object the provision of a lure embodying means to deflect weeds, moss, grass and the like away from the hook as the lure moves through the water.

A further object of my invention is to provide a weed deflector for association with the hook or hooks of a lure which shall be fully effective in keeping the hook free of weeds and the like, but which does not interfere with hooking a fish when a strike is obtained.

A further object is to provide a weed deflector embodying a pair of backwardly extending, spring steel wires straddling the hook, and having an attaching portion 10 for securing the deflector to the body of the lure, so constructed that when the attaching portion is in place, the forward end thereof is pressed into contact with the lure body, thus preventing weeds, moss, grass and the like from becoming caught under the forward end of the attaching portion.

My invention is illustrated in the accompanying drawings forming a part of this application in which:

Fig. 1 is a side elevational view of a spoon lure having my improved weed deflector in position thereon;

Fig. 2 is a plan view of the lure shown in Fig. 1;

Fig. 3 is a side elevational view partly broken away and in section, and showing a different form of lure with my improved deflector in position thereon;

Fig. 4 is a bottom view of the lure shown in Fig. 3;

Fig. 5 is a side elevational view of my deflector detached from the lure; and,

Fig. 6 is a perspective view of the deflector detached from the lure.

Referring now to the drawings for a better understanding of my invention, and more particularly to Figs. 1 and 2 thereof, I show a well known form of spoon lure 10 formed of a flat sheet of metal and having an upwardly bent, cupped rear end 11. The hook 12 is connected to the plate 10 by means of a screw 13, and extends through a hole 14 in the cupped end 11. An opening 16 is provided in the front end of the lure for attaching a leader.

My improved weed deflector 17 comprises a length of spring steel wire bent intermediate its ends to form an eyelet 18 through which the screw 13 passes. As shown in Figs. 5 and 6, each side of the wire extends forwardly from the eyelet 18 to provide a generally straight mounting portion 19 formed of parallel portions 20 and 21 of the wire. The eyelet 18 is bent slightly inwardly toward the lure body with respect to the portions 20 and 21, as best shown in Fig. 5, whereby when the screw 13 is inserted, the mounting portion 19 comprising the sections 20 and 21 and the eyelet 18 is held under spring pressure.

The sections 20 and 21 of the wire are curved outwardly and rearwardly as indicated at 22 to overlie the mounting portion, thereby to provide a pair of backwardly extending prongs 23 and 24. The prongs 23 and 24 diverge from the point 22 rearwardly, thereby to straddle the hook 12. The angle of the bend 22 is such that the inwardly bent, curved ends 26 and 27, provided on the rear ends of the prongs 23 and 24 lie slightly outward from the point of the hook 12 as clearly shown in Fig. 1.

In Figs. 3 and 4 I show the deflector attached to a different form of lure 28 embodying a hook 29. In this instance the screw 31 holding the hook 29 is disposed on the bottom of the lure, and the deflector 17 is mounted on the lure by means of the screw 31, similarly as it is held by the screw 13. The rearwardly extending prongs 23 and 24 are disposed with their curved ends 26 and 27 on either side of the hook 29 and lie slightly outwardly from the point of the hook.

In both forms of lures shown and described, the screws 13 and 31 are first removed, and the mounting portion of my deflector is placed in direct contact with the body of the lure. The eye of the hook is placed on top of the eyelet 18, and the screw 13 or 31 is run in. This causes the end of the mounting portion 19 at the point of bend 22 to lie flat against the body of the lure and to be held thereagainst by spring action due to the bending of the eyelet 18 at the point of connection therewith to the portions 20 and 21 of the wire. Consequently, when the lure is pulled through the water, grass and weeds do not become caught between the deflector and lure body at the point of bend 22.

I preferably form the deflector of relatively small diameter spring steel wire, though obviously the size of such wire will vary with the size of the lure. In all events, the wire is made of such size that it offers minimum resistance to bending about the point 22 and for general deflection throughout the length of the prongs 23 and 24, so that when a fish strikes the lure the prongs move inwardly toward the body of the lure, uncovering the point of the hook. It will be noted that the downturned ends 26 and 27 adjacent the hook serve to cause inward movement of the prongs 23 and 24 in the event a fish strikes the lure from the rear. In practice, I have found that this feature is important because a large number of strikes are obtained by fish approaching the lure from the rear. I have found that my improved weed deflector does not interfere in any way with the function of the hook in catching the fish, and that at the same time it is highly effective in keeping the hook free of weeds, moss, and the like.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claim.

What I claim is:

A weed deflector in combination with a fishing lure having a body and carrying a hook at the rear thereof, a single length of spring steel wire providing a pair of prongs straddling the point of the hook and displaced laterally on either side of the point, the ends of said prongs adjacent the hook having a bend inwardly toward the lure body, each of said prongs extending forwardly and toward the lure body and thence having a bend under and rearwardly to form parallel portions, an eyelet formed on the rear ends of the parallel portions, said eyelet having a bend inwardly toward the body of the lure with respect to the parallel portions and a common screw securing the hook and said eyelet to the lure body and disposed to flatten the eyelet and parallel portions against the body thereby holding the forward end of the parallel portions of the lure under spring tension against the lure body.

WALTER H. BAILEY.

REFERENCES CITED

The following references are of record in the file of this patent:

UNITED STATES PATENTS

| Number | Name | Date |
| --- | --- | --- |
| 216,512 | Dalzell | June 17, 1879 |
| 1,609,209 | Schnell | Nov. 30, 1926 |
| 2,167,163 | Toepper | July 25, 1939 |
| 2,254,981 | Sisco | Sept. 2, 1941 |
| 2,289,265 | Heddon | July 7, 1942 |
| 2,307,836 | Heddon | Jan. 12, 1943 |